United States Patent
Schenck et al.

(10) Patent No.: US 10,838,600 B2
(45) Date of Patent: Nov. 17, 2020

(54) SYSTEMS AND METHODS FOR PROVIDING AN EXTENDED REALITY INTERFACE

(71) Applicant: Wayfair LLC, Boston, MA (US)

(72) Inventors: Michael Philip Schenck, Malden, MA (US); Shrenik Sadalgi, Cambridge, MA (US); Michael Silvio Festa, Wakefield, MA (US)

(73) Assignee: Wayfair LLC, Boston, MA (US)

( * ) Notice: Subject to any disclaimer, the term of this patent is extended or adjusted under 35 U.S.C. 154(b) by 0 days.

(21) Appl. No.: 16/271,714

(22) Filed: Feb. 8, 2019

(65) Prior Publication Data

US 2019/0250802 A1    Aug. 15, 2019

Related U.S. Application Data

(60) Provisional application No. 62/743,019, filed on Oct. 9, 2018, provisional application No. 62/629,627, filed on Feb. 12, 2018.

(51) Int. Cl.
*G06F 3/048* (2013.01)
*G06F 3/0484* (2013.01)
(Continued)

(52) U.S. Cl.
CPC .......... *G06F 3/04845* (2013.01); *G01P 13/00* (2013.01); *G01S 5/16* (2013.01);
(Continued)

(58) Field of Classification Search
CPC ....... G06T 19/006; G06T 19/20; G06T 19/00; G06T 19/003; A63F 2300/8082;
(Continued)

(56) References Cited

U.S. PATENT DOCUMENTS

| 10,319,150 B1* | 6/2019 | Canada | ................... G06T 11/60 |
| 2002/0010655 A1* | 1/2002 | Kjallstrom | ............. G06Q 30/02 |
| | | | 705/26.62 |

(Continued)

OTHER PUBLICATIONS

Reuksupasompo et al., AR Development for Room Design; 2018; IEEE; 6 pages.*

(Continued)

*Primary Examiner* — Linh K Pham
(74) *Attorney, Agent, or Firm* — Wolf, Greenfield & Sacks, P.C.

(57) ABSTRACT

Some embodiments include a system comprising an extended reality (XR) display device configured to display an XR interface to a user; at least one hardware processor communicatively coupled to the XR display device and configured to perform: receiving a model of a room; receiving a plurality of furniture models corresponding to a plurality of pieces of furniture; providing the XR interface using the model of the room and the plurality of furniture models at least in part by: displaying, via the XR display device, a furniture display comprising at least some of the plurality of furniture models and a search field to permit entry of text; detecting entry of a text string into the search field; identifying, using the text string, at least one furniture model from the plurality of furniture models; and displaying, via the XR display device, the at least one furniture model in the furniture display.

19 Claims, 13 Drawing Sheets

(51) Int. Cl.
*G06F 3/0481* (2013.01)
*G06F 3/0482* (2013.01)
*G01P 13/00* (2006.01)
*G06F 16/53* (2019.01)
*G01S 5/16* (2006.01)
*G06F 3/01* (2006.01)

(52) U.S. Cl.
CPC ........ *G06F 3/0482* (2013.01); *G06F 3/04815* (2013.01); *G06F 16/53* (2019.01); *G06F 3/012* (2013.01)

(58) Field of Classification Search
CPC ...... G06F 16/53; G06F 3/011; G06F 3/04815; G06F 3/0482; G06F 3/04845
See application file for complete search history.

(56) References Cited

U.S. PATENT DOCUMENTS

| | | | |
|---|---|---|---|
| 2008/0071559 A1* | 3/2008 | Arrasvuori | G06Q 30/06 705/26.1 |
| 2009/0222424 A1* | 9/2009 | Van | G06Q 30/0277 |
| 2013/0212519 A1* | 8/2013 | Chang | G06F 9/451 715/781 |
| 2014/0100997 A1* | 4/2014 | Mayerle | G06Q 30/0643 705/27.2 |
| 2019/0026936 A1* | 1/2019 | Gorur Sheshagiri | G06F 3/04842 |

OTHER PUBLICATIONS

Sebastian et al., Model-based Design of Interactions that can bridge Realities; IEEE; 2011; 9 pages.*

* cited by examiner

US 10,838,600 B2

SYSTEMS AND METHODS FOR PROVIDING AN EXTENDED REALITY INTERFACE

CROSS-REFERENCE TO RELATED APPLICATIONS

This application claims the benefit under 35 U.S.C. § 119(e) to U.S. Provisional Application Ser. No. 62/629,627, titled "SYSTEMS AND METHODS FOR PROVIDING AN EXTENDED REALITY INTERFACE," filed on Feb. 12, 2018, and U.S. Provisional Application Ser. No. 62/743,019, titled "SYSTEMS AND METHODS FOR PROVIDING AN EXTENDED REALITY INTERFACE", filed on Oct. 9, 2018, each of which is incorporated by reference herein in its entirety.

BACKGROUND

Online retailers primarily sell products (e.g., furniture, toys, clothing, and electronics) through an online computer interface. Thereby, a customer can access the online computer interface to order products and have the products delivered to their home within a few days. Customers of online retailers, however, are increasingly demanding to see products in-person prior to purchase. Accordingly, some online retailers have established brick-and-mortar stores where customers can interact with products in-person prior to purchase.

SUMMARY

According to at least one aspect, a system is provided. The system comprises an extended reality (XR) display device configured to display an XR interface to a user; at least one XR control device configured to receive input from the user in the XR interface; at least one hardware processor communicatively coupled to the XR display device and the at least one XR control device; and at least one non-transitory computer-readable storage medium. The at least one non-transitory computer-readable storage medium stores processor executable instructions that, when executed by the at least one hardware processor, cause the at least one hardware processor to perform: receiving a model of a room; receiving a plurality of furniture models corresponding to a plurality of pieces of furniture; providing the XR interface using the model of the room and the plurality of furniture models at least in part by: displaying, via the XR display device, a furniture display comprising at least some of the plurality of furniture models and a search field to permit entry of text; detecting entry of a text string into the search field; identifying, using the text string, at least one furniture model from the plurality of furniture models; and displaying, via the XR display device, the at least one furniture model in the furniture display.

According to at least one aspect, a method is provided. The method comprises: receiving a model of a room; receiving a plurality of furniture models corresponding to a plurality of pieces of furniture; providing an XR interface using the model of the room and the plurality of furniture models at least in part by: displaying, via an XR display device, a furniture display comprising at least some of the plurality of furniture models and a search field to permit entry of text; detecting entry of a text string into the search field; identifying, using the text string, at least one furniture model from the plurality of furniture models; and displaying, via the XR display device, the at least one furniture model in the furniture display.

According to at least one aspect, at least one non-transitory computer-readable storage medium storing processor-executable instructions is provided. The process-executable instructions, when executed by at least one processor, cause the at least one processor to perform: receiving a model of a room; receiving a plurality of furniture models corresponding to a plurality of pieces of furniture; providing the XR interface using the model of the room and the plurality of furniture models at least in part by: displaying, via a XR display device, a furniture display comprising at least some of the plurality of furniture models and a search field to permit entry of text; detecting entry of a text string into the search field; identifying, using the text string, at least one furniture model from the plurality of furniture models; and displaying, via the XR display device, the at least one furniture model in the furniture display.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1:
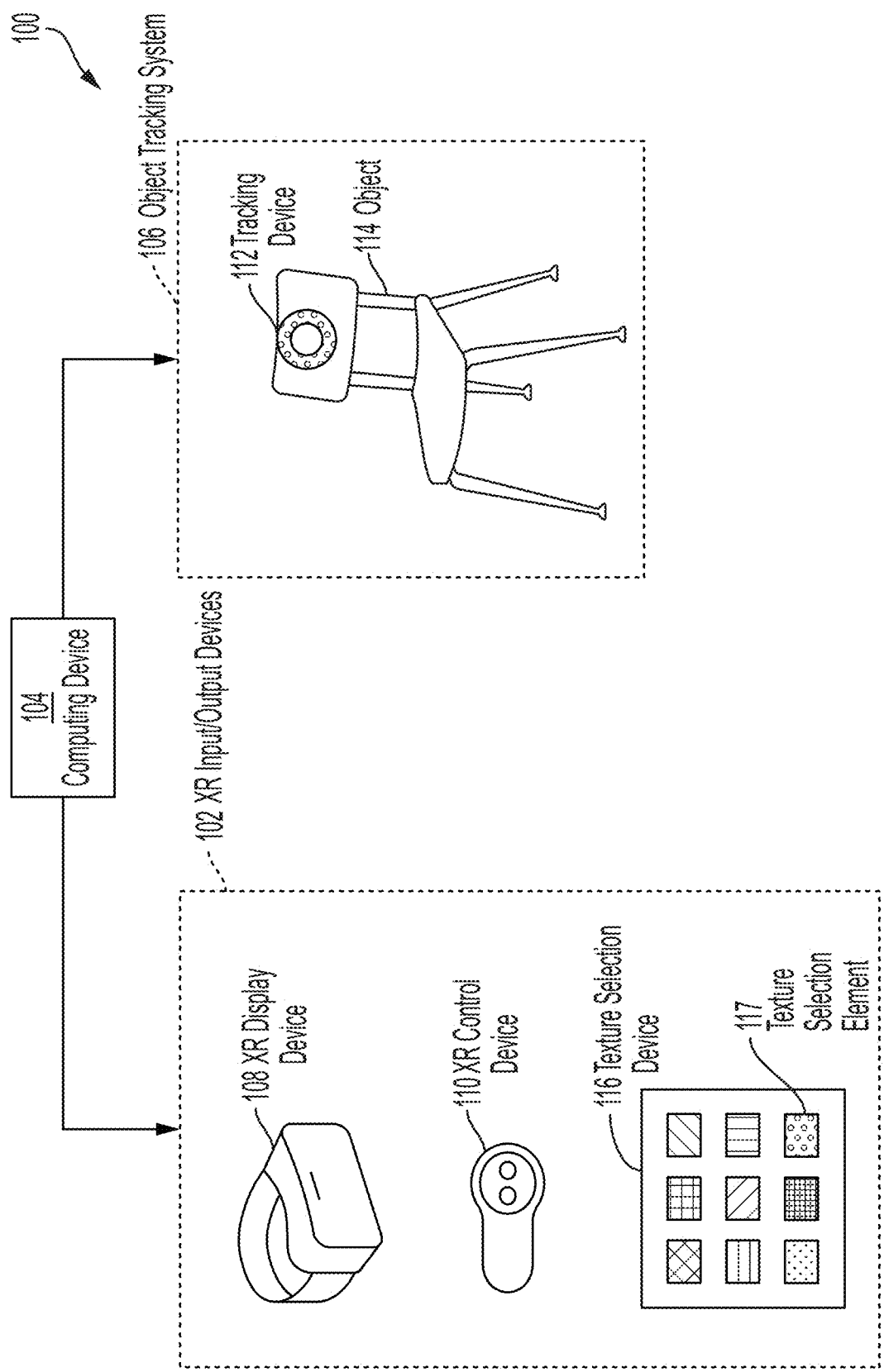
FIG. 1 is a diagram of an example extended reality (XR) system, according to some embodiments of the technology described herein.

As mentioned above, some online retailers have established brick-and-mortar stores to make products available for customers to see in-person prior to purchase. The inventors have appreciated that online retailers typically offer a wider range of products than brick-and-mortar only retailers. For example, an online retailer may offer in excess of 1 million different products while a brick- and mortar only retailer in the same market segment may only offer 15,000 products. As a result, the conventional approach of displaying all of a retailer's product offerings in a single store would require a brick-and-mortar store of considerable size. The size requirement is further exacerbated when the products being sold are large, such as pieces of furniture, and there are many variations of the same product (e.g., color, size, and/or material). Thereby, a typical store for a brick-and-mortar only furniture retailer with a limited number of products may be approximately 25,000 square feet while a brick-and-mortar store for on online furniture retailer with millions of products would need to be in excess of 450,000 square feet.

Accordingly, the inventors have developed new techniques to re-use retail space using, for example, extended reality (XR) systems. XR systems may be employed to create a virtual environment where a customer can interact with the products available for purchase from the retailer. Example XR systems include: virtual reality (VR) systems, augmented reality (AR) systems, and mixed reality (MR) systems. For example, the customer may interact with a display in the virtual environment where the customer can search using one or more search criteria (e.g., keywords and/or images) for products available from the retailer to interact with in the virtual environment. As a result, a customer may be provided an opportunity to interact with millions of products available from the retailer prior to purchase within a small space (e.g., a space that is less than 250 square feet). Once the customers have interacted with products in the virtual environment, the customer may be provided an opportunity to purchase one or more of these products through a check-out screen displayed in the virtual environment. The check-out screen may include a list of one or more products interacted with in the virtual environment and a price associated with each of the one or more products.

Additionally (or alternatively), XR systems may be employed in conjunction with a limited set of products within a retail space to provide customers with a near-realistic experience of interacting with a wider range of products. For example, the XR system may track the movements of products in the retail-space and mimic those movements in a virtual environment. Thereby, a customer can move a product in the retail-space and see a corresponding model of the product in the virtual environment move in the same manner. The customer may change characteristics of the model of the product (such as the color, and/or material of the product) in the virtual environment to see different variations of the same product. Accordingly, a customer can have the experience of both touching a product and seeing all of the variations of the product without the retailer having to store all of the variations of the product. In one implementation for illustration, a customer may sit on a brown leather chair in a retail-space while using the XR system. In this implementation, the customer may see a virtual environment that comprises a model of the brown leather chair at the same location as the brown leather chair in the retail space. The customer may interact with the model of the brown leather chair in the virtual environment to change, for example, the color of the chair in the virtual environment (e.g., from brown to black). Thereby, the customer may be able to both touch the leather chair and see the leather chair in different colors without the retailer having to store a version of the leather chair in each available color. As a result, the space required for an online retailer to provide customers an opportunity to interact with any of the offered products prior to purchase is substantially reduced because only a single version of any given product needs to be stored in the retail-space.

Accordingly, a XR system is provided that is configured to create a virtual environment in which a user can interact with a wide-range of products. In some embodiments, the system comprises a XR display device configured to display a XR interface to the user that comprises, for example, a virtual environment. The XR display device may comprise, for example, a display configured to display a portion of the virtual environment to the user such as a head-mounted display (e.g., a stereoscopic head-mounted display). The display may be non-transparent, semi-transparent, or transparent depending upon the particular implementation. The XR display device may further comprise one or more components to facilitate tracking of a movement of a head of the user. Thereby, the portion of the virtual environment displayed to the user may change as the user moves to immerse the user in the virtual environment. The system may further comprise at least one XR control device configured to receive input from the user in the XR interface. The XR control device may be any of a variety of input devices including, for example, motion tracking input devices, such as motion tracking controllers, and non-motion tracking input devices, such as non-motion tracking motion tracking controllers, microphones, keyboards, and mice.

In some embodiments, the XR system comprises a computing device communicatively coupled to the XR input/output devices (e.g., the XR display device and/or the XR control device). The computing device may comprise, for example, at least one hardware processor and at least one non-transitory computer-readable storage medium storing processor executable instructions that, when executed by the at least one hardware processor, cause the at least one hardware processor to generate the virtual environment for the user. The instructions may cause the at least one hardware processor to receive a model of a room (e.g., a room in a building such as a bedroom, a living room, an office, or a kitchen). The model of the room may, for example, comprise information that defines the characteristics of the room such as: room dimensions (e.g., length, width, wall height, etc.), wall color(s), door location(s), and window location(s). The received model of the room may be generated in any of a variety of ways. For example, the model of the room may be generated using a room scanner such as a three-dimensional (3D) laser scanner. As another example, the model may be generated by a user through a web-based application providing the user with an interface to design a room (e.g., the user set the room dimensions, wall color(s), door location(s) and window location(s) through the web-based interface).

The instructions may further cause the at least one hardware processor to receive a plurality of furniture models corresponding to a plurality of pieces of furniture. Example pieces of furniture include: couches, chairs, desks, tables, shelves, bookcases, beds, nightstands, cabinets, rugs, dressers, wardrobes, entertainment centers, and decorative items, such as statutes, wall art, picture frames, books, and vases. Each of the furniture models may define the characteristics of the piece of furniture such as the shape and/or size of the furniture. Additionally, the plurality of furniture models may be accompanied by meta-information associated with the plurality of furniture models. For example, the meta-information associated with a given furniture model for a piece of furniture may comprise any of the following information: (1) a price of the piece of furniture; (2) a description of the piece of furniture; (3) image(s) of the piece of furniture; (4) review(s) of the piece of furniture; and (4) a list of one or more products that are related to the piece of furniture (e.g., products frequently purchased with the piece of furniture).

In some embodiments, the instructions further cause the at least one hardware processor to provide the XR interface using the model of the room and the plurality of furniture models. For example, a virtual environment may be created where a user can move around the model of the room and place furniture models in the room. A user may be permitted to add furniture models to the model of the room using a furniture display. The furniture display may be, for example, displayed to the user via the XR display device and comprise at least some of the plurality of furniture models and a search field to permit entry of one or more search criteria. Example search criteria include a text string comprising one or more keywords to match with meta-information associated with furniture models and an image comprising a depiction of a piece of furniture to match with one or more furniture models. The search field may be employed by the user to identify furniture models to add to the model of the room. For example, a user may enter search criteria into the search field and at least one furniture model from the plurality of furniture models may be identified using the search criteria. The identified at least one furniture model may, in turn, be added to the furniture display and displayed to the user via the XR display device. The search criteria may be entered into the search field in any of a variety of ways. For example, a keyboard may be displayed in the XR interface and the user may be permitted to enter a text string into the search field via the keyboard using the XR control device. In another example, a microphone may be integrated into one or more components of the XR system (e.g., an XR control device and/or an XR display device) and the user may say a phrase that is, in turn, converted into text and entered into the search field.

In some embodiments, the model of the room may be provided to a designer or other third party who alter the design of the room by adding one or more pieces of furniture to the room, removing one or more more pieces of furniture from the room, and/or moving the location of one or more pieces of furniture within the room to different locations. In some embodiments, the designer or other third party may alter the design of the room without using an XR interface, though in other embodiments, the designer or other third party may use an XR interface to alter the design of the room. After a designer or other third party alters the design of the room (with or without using the XR interface, for example, using a web interface), a user may view the altered design using the XR interface (e.g., at a store). In this way, for example, a designer can change the design of a room using a web interface and the user can experience the new design using an XR system in the store.

In some embodiments, the XR system is configured to track the movement of an object in the real-world and move a furniture model in the virtual environment so as to mimic the movement of the object in the real-world. Thereby, a user may move an object in the real-world (e.g., a chair) and see a corresponding furniture model in the virtual environment move in the same fashion. In these embodiments, the system may further comprise an object tracking system coupled to the computing device and configured to generate information indicative of a location of a real-world object that corresponds to a furniture model in the model of the room. The object tracking system may comprise, for example, a XR tracker that is attached to the real-world object. Thereby, the object tracking system may track the movements of the XR tracker to generate information indicative of the location of the real-world object. The generated information indicative of the location of the real-world object may be employed detect movement of the real-world object and move the corresponding furniture model in the virtual environment based on the detected movement.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

Example XR Systems

FIG. 1 shows an example XR system 100 that is configured to provide a virtual reality experience to a user. For example, the XR system 100 may permit a user to interact with a virtual environment that comprises a model of a room. Within the virtual environment, a user may interact with furniture models in the room including, for example, adding a furniture model to the model of the room, removing a furniture model to the model of the room, moving a furniture model in the model of the room, and/or changing a characteristic of a furniture model in the model of the room (e.g., color, material, size, etc.). The virtual environment may be created by, for example, a computing device 104 in the XR system 100. A user may interact with the virtual environment using XR input/output devices 102 that are communicatively coupled to the computing device 104. For example, the user may view the virtual environment using a XR display device 108 and interact with furniture models within the virtual environment using a XR control device 110. Additionally (or alternatively), a user may change a texture applied to furniture model in the virtual environment using a texture selection device 116.

The XR display device 108 may be configured to display a XR interface to the user that comprises, for example, a virtual environment. The XR display device may be implemented as a head-mounted display (e.g., a stereoscopic head-mounted display) configured to display a portion of the virtual environment to the user. The XR display device may comprise one or more components to facilitate tracking of a movement of a head of the user such as inertial measurement units (IMUs), infrared light sources, and/or infrared light detectors. Thereby, the portion of the virtual environment displayed to the user may change as the user moves to immerse the user in the virtual environment.

The XR control device 110 may be configured to receive input from the user in the XR interface. The XR control device may be any of a variety of input devices including, for example, motion tracking input devices, such as motion tracking controllers, and non-motion tracking input devices, such as non-motion tracking controllers, microphones, keyboards, and mice.

The texture selection device 116 may be configured to receive input from the user comprising an indication of a texture model (e.g., a texture of a material) from a plurality of texture models to apply to a furniture model in the virtual environment. The texture selection device 116 may be implemented as, for example, a controller (e.g., a motion tracking controller or a non-motion tracking controller) with a plurality of texture selection elements 117 that may be each designed to replicate the texture of a material (e.g., a leather or fabric). Upon activation of a texture selection element 117, the XR system 100 may add the texture model associated with the texture selection element 117 to a furniture model in the virtual environment. The texture selection elements 117 may be implemented by at least partially covering an array of buttons with various materials. For example, the texture selection element 117 associated with a fabric texture may comprise a button that is at least partially covered with the fabric. Thereby, a user may be provided the experience of touching various materials while in a virtual environment.

It should be appreciated that a model of the texture selection device 116 may be added to the virtual environment that tracks the movement of the texture selection device 116 in the real-world. Thereby, a user viewing a non-transparent display may be able to find the texture selection device 116 in the real-world despite the user's view of the real-world being obscured by the non-transparent display. Further, the XR system may change one or more characteristics of the model of the texture selection device 116 in the virtual environment such as the color of materials on one or more of the texture selection elements 117. For example, a texture selection element 117 may be covered in a leather that comes in multiple colors (e.g., black, brown, and tan). In this example, the XR system may change a color of the model of the texture selection element 117 to mimic the different color options. Thereby, a user may be provided both the tactile experience of feeling the leather and the visual experience of seeing the leather in different colors.

In some embodiments, the XR system 100 may be configured to track the movement of real-world objects 114 using an object tracking system 106 communicatively coupled to the computing device 104. The tracked movements of the objects 114 may be employed to move corresponding furniture models in a virtual environment. For example, a user may move the object 114 to the right and a furniture model in the virtual environment that corresponds to the object 114 may also move to the right. The object tracking system 106 may be configured to track the movement of the object 114 using a tracking device 112 that is attached to the object 114. For example, the object tracking system 106 may track movement of the tracking device 112 in a real-world environment and deduce the movement of the object 114 based on the tracked movement of the tracking device 112.

It should be appreciated that the tracking device 112 may be implemented in any of a variety of ways. For example, the object tracking system 106 may comprise a plurality of infrared light sources (not shown) that are positioned at a fixed location and configured to emit infrared light in a particular pattern. In this example, the tracking device 112 may comprise a plurality of infrared light detectors that are configured to detect the light emitted by the infrared light sources. The order in which the plurality of light detectors on the tracking device 112 detect infrared light may be indicative of, for example, the position of the tracking device 112 (and thereby the object 114) relative to the fixed position of the infrared light sources. Additionally (or alternatively), the tracking device 112 may comprise an IMU that directly detects the movement of the tracking device 112.

Figure 2:
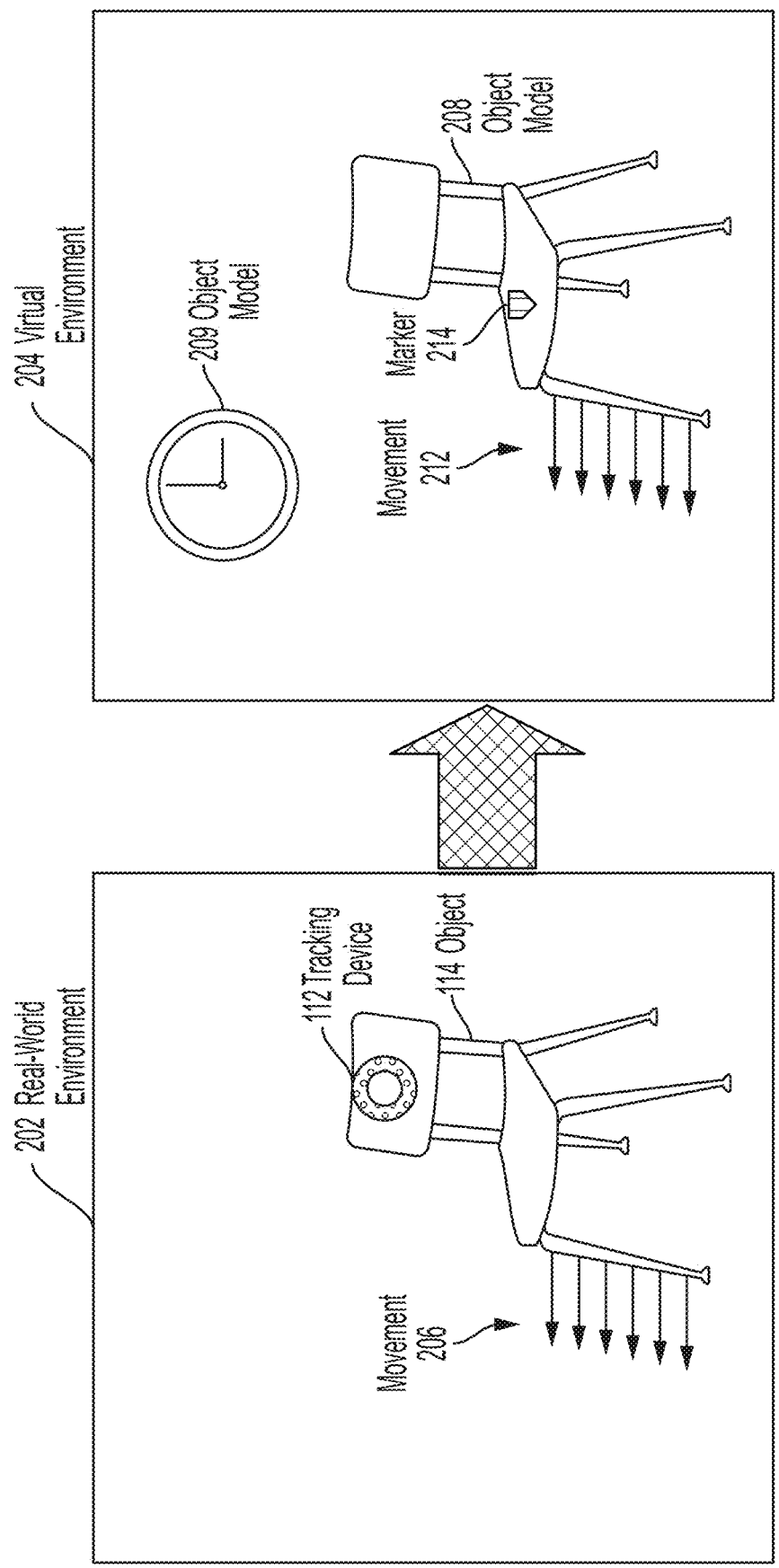
FIG. 2 is a diagram of an example real-world environment and a corresponding virtual environment created by the XR system of FIG. 1, according to some embodiments of the technology described herein.

FIG. 2 is a diagram of an example real-world environment 202 and a corresponding virtual environment 204 created by the XR system 100 that shows how a movement of the object 114 in the real-world environment 202 may be mimicked in the virtual environment 204. As shown, the real-world environment 202 comprises the object 114 with the tracking device 112 affixed thereto being moved to the left (shown as movement 206). The virtual environment 204 comprises an object model 208 that corresponds to the object 114 in the real-world environment 202. The movement 206 of the object 114 in the real-world environment 202 triggers movement 212 of the object model 208 in the virtual environment 204. As shown, the direction of the movement 212 in the virtual environment 204 matches the direction of the movement 206 in the real-world environment 202. Additionally, the magnitude of the movements 206 and 212 may be the same (or approximately the same). For example, the object 114 may be moved to the left fifteen inches and the object model 208 may also be moved to the left by the same distance (e.g., fifteen inches).

The virtual environment 204 may comprise both object models that correspond to real-world objects, such as object model 208, and object models that do not correspond to any real-world objects, such as object model 209. For example, a user may add a new object model for a couch to the virtual environment 204 to see how the couch looks in the room. A user, however, may not be able to readily keep track of which object models in the virtual environment 204 correspond to real-world objects and which object models do not. Thereby, a user may inadvertently try to sit on a couch in the virtual environment that doesn't exist in the real-world and/or inadvertently trip over a real-world object.

Accordingly, in some embodiments, the virtual environment 204 may differentiate object models that correspond to real-world objects from those that do not correspond to real-world objects. These object models may be differentiated using markers (shown as markers 214). For example, markers 214 may be placed on only those object models that correspond to real-world objects, such as object model 208, to signal to the user that these objects exist in the real-world. Conversely, markers 214 may be placed on only those object models that do not correspond to any real-world object, such as object model 209, to signal to the user that these objects do not exist in the real-world. It should be appreciated that still yet other techniques may be employed to differentiate the object models that correspond to real-world objects from those object models that do not correspond to real-world objects. For example, a first marker type may be placed on those object models that correspond to real-world objects and a second, different marker type may be placed on those object models that do not correspond to real-world objects.

Example XR Processes

Figure 3:
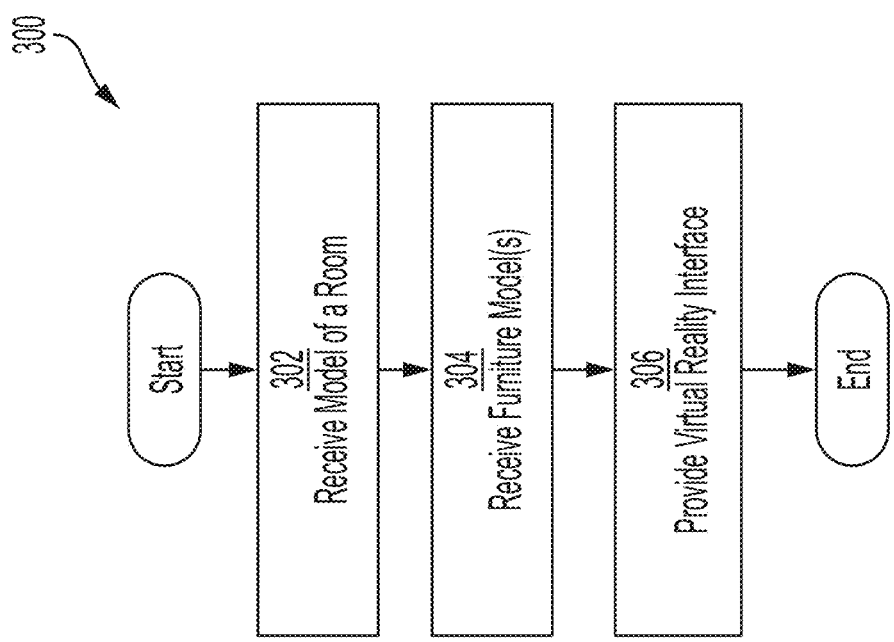
FIG. 3 is a flowchart of an example process for providing a virtual reality experience to a user, according to some embodiments of the technology described herein.

FIG. 3 shows an example process 300 for providing a virtual reality experience to a user. The process 300 may be performed by, for example, a XR system such as XR system 100 described above with reference to FIG. 1. As shown, the process 300 comprises an act 302 of receiving a model of a room, an act 304 of receiving furniture model(s), and an act 306 of providing a XR interface.

In act 302, the system may receive a model of a room. The model of the room may, for example, comprise information that defines the characteristics of the room such as: room dimensions (e.g., length, width, wall height, etc.), wall color(s), door location(s), and window location(s).

In act 304, the system may receive furniture model(s) associated with pieces of furniture. The furniture models may define the characteristics of the pieces of furniture such as the shape and size of the furniture. Example pieces of furniture include: couches, chairs, desks, tables, shelves, bookcases, beds, nightstands, cabinets, rugs, dressers, wardrobes, and entertainment centers. Additionally, the system may receive meta-information associated with each of the received furniture models that may be employed to facilitate filtering, searching, and/or sorting the received furniture models. The meta-information with a given furniture model may comprise any of the following information: (1) a price of the piece of furniture; (2) a description of the piece of furniture; (3) image(s) of the piece of furniture; (4) review(s) of the piece of furniture; and (4) a list of one or more products that are related to the piece of furniture (e.g., products frequently purchased with the piece of furniture).

In act 306, the system may provide a XR interface using the model of the room and the furniture models. For example, the XR interface may comprise a virtual environment where a user may navigate the model of the room and add one or more of the furniture model(s) received in act 304 to the room. The XR interface may comprise a furniture display that permits a user to select furniture models to add to the model of the room. The XR interface may limit the particular locations onto which a furniture model may be placed to mimic a real-world environment based on a set of one or more placement constraints that, for example, define the criteria that a surface must meet in order for a given furniture model to be placed on the surface. For example, the placement constraints may only allow a couch to be placed on a floor (and thereby disallow placement on a wall, the ceiling, or a table). In another example, the placement constraints for a vase may only allow the vase to be placed on the floor or a flat surface on a piece of furniture (such as a shelf in a bookshelf). In yet another example, the placement constraints for a piece of wall art may only allow placement of the wall art on a wall (and thereby disallow placement on the floor).

Figure 8:
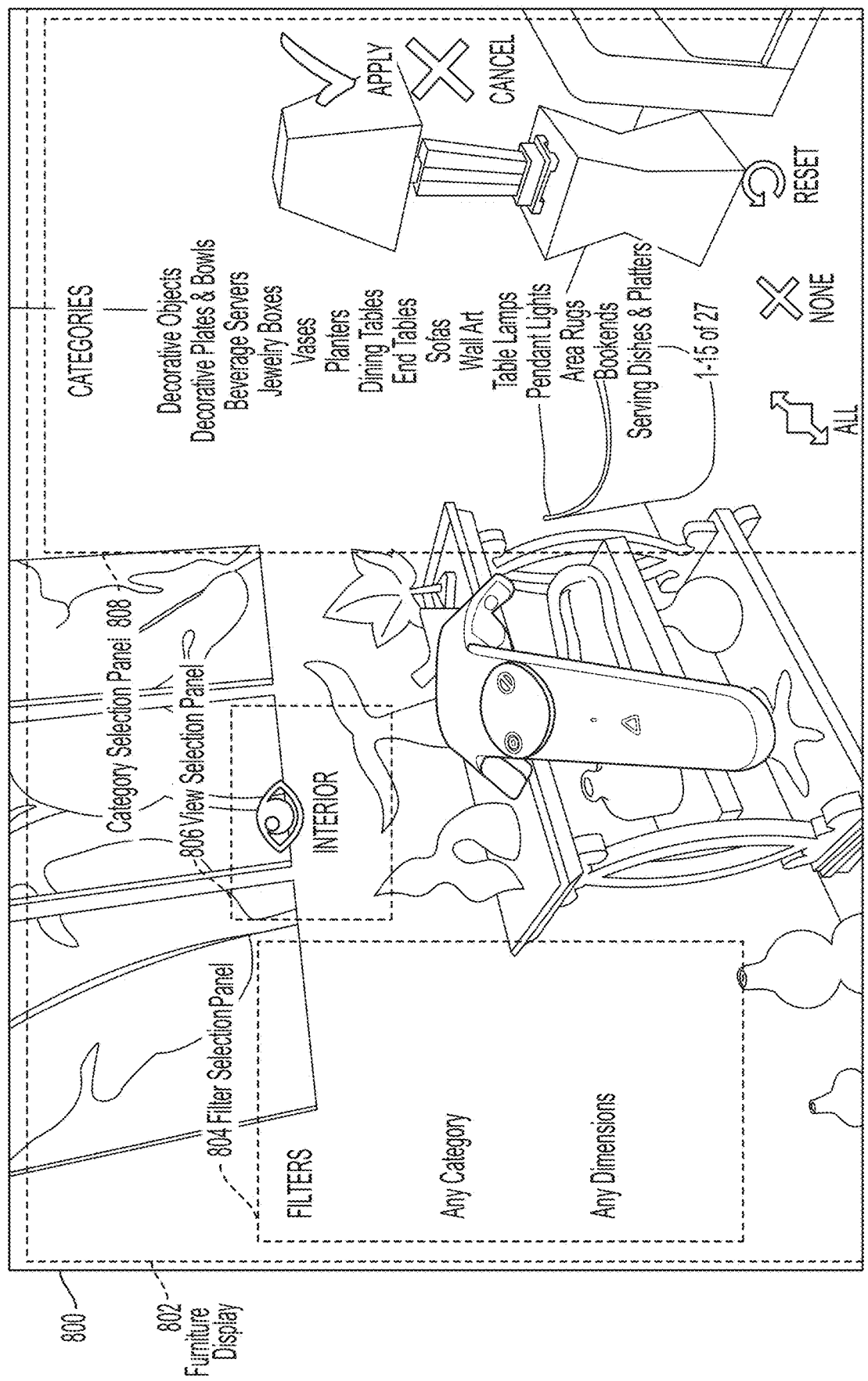
FIG. 8 is a diagram of an example XR interface screen including a furniture display, according to some embodiments of the technology described herein.

An example XR interface screen is shown in FIG. 8 by screen 800. As shown, the screen 800 depicts a view of a furniture display 802 that is overlaid onto a view of a model of a room with furniture models placed therein. The furniture display 802 may enable a user to manipulate furniture models within the room, such as add a new furniture model to the model of the room and/or change furniture models placed in the model of the room. The furniture display 802 comprises a filter selection panel 804 that presents a plurality of filter options that may be used to find a particular piece of furniture. In response to activation of any of the filter options, the system may identify a subset of furniture models in the set of furniture models available to be added to the model of the room that have meta-information that matches the criteria associated with the filter. Example filters include: (1) a category filter that identifies those furniture models that are assigned to a particular furniture category (e.g., sofas, chairs, table lamps, decorative objects, dining tables, end tables, etc.); (2) a dimension filter that identifies those furniture modes that have dimensions within a specified range (e.g., pieces of furniture that fit within a cube of a certain size, such as a cube with a height, width, and length equal to 4 feet); and (3) a keyword filter that identifies those furniture models with meta-information that includes the input keyword(s) (e.g., glass, basket, book, etc.).

Upon selection of a particular filter in the filter selection panel 804, the system may present a new panel in the furniture display 802 that allows a user to define the characteristics of the selected filter. For example, as shown in FIG. 8, a selection of the category filter in the filter selection panel 804 may be detected and, in response to detecting the selection of the category filter, display a category selection panel 808. The category selection panel 808 may present a list of all of the available categories and permit selection of one or more of the categories of interest to the user. The system may close the category selection panel 808 responsive to detecting activation of the "cancel" button. The categories may be selected (or unselected) individually responsive to the system detecting activation of a respective category name. All of the categories may be selected responsive to the system detecting activation of the "all" button. Similarly, all of the categories may be unselected responsive to the system detecting activation of the "none" button. The system may reset the selected categories to a previous state responsive to activation of the "reset button." Once the system detects activation of the "apply" button, the system may identify a set of furniture models that match the specified criteria.

Figure 10:
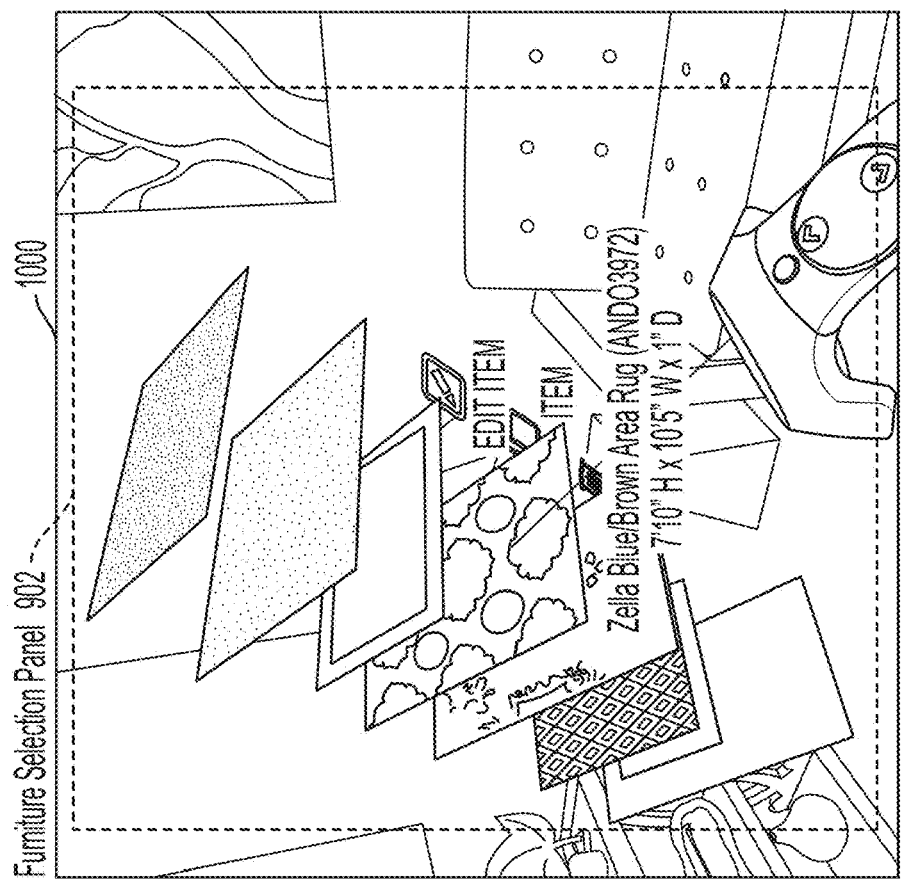
FIGS. 9 and 10 are diagrams of example XR interface screens including a furniture selection panel, according to some embodiments of the technology described herein.
Figure 9:
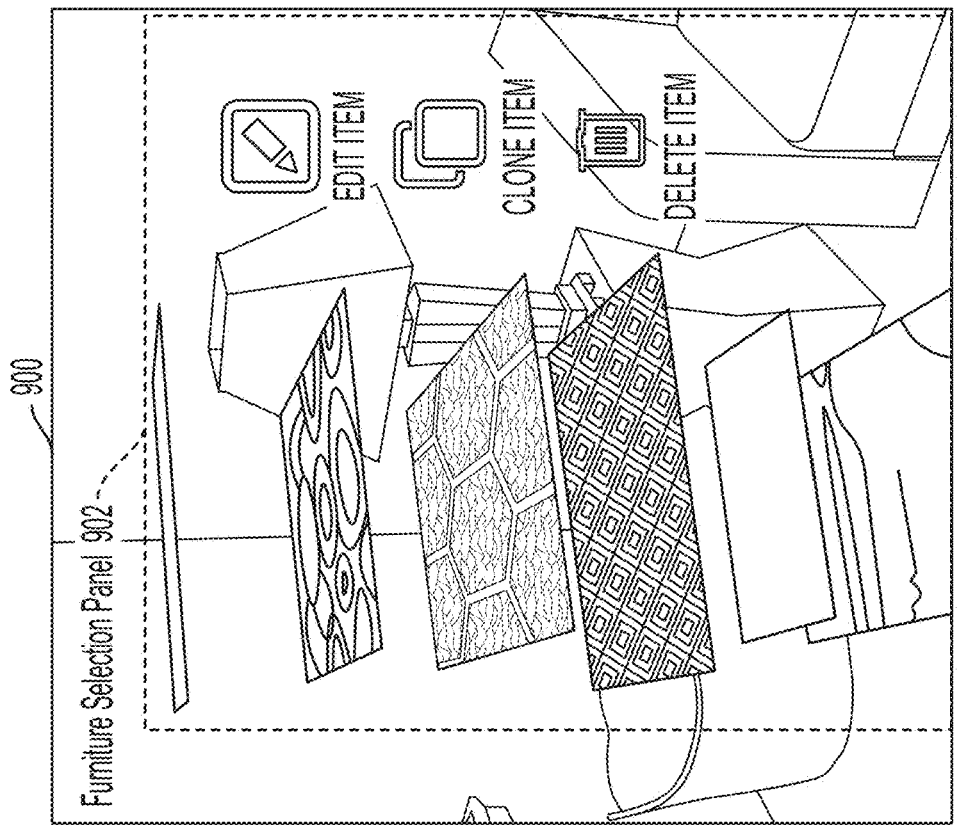

The set of furniture models that match the specified filtering criteria may be presented in a furniture selection panel that replaces the category selection panel 808 in the furniture display 802. Example XR interface screens showing a furniture selection panel are shown in FIGS. 9 and 10 by screens 900 and 1000, respectively. As shown, screen 900 includes a furniture selection panel 902 with a set of furniture models arranged in a column. The furniture selection panel 902 may display additional information regarding a particular furniture model once the furniture model is selected as shown in screen 1000. The displayed additional information may include, for example, the name the furniture model, the serial number for the piece of furniture to which the furniture model corresponds, and/or the dimensions of the furniture model. The furniture models displayed in the furniture selection panel 902 may be added to the model of the room. For example, a selected furniture model in the furniture selection panel 902 may be added to the room responsive to detecting a click-and-drag action.

Figure 11:
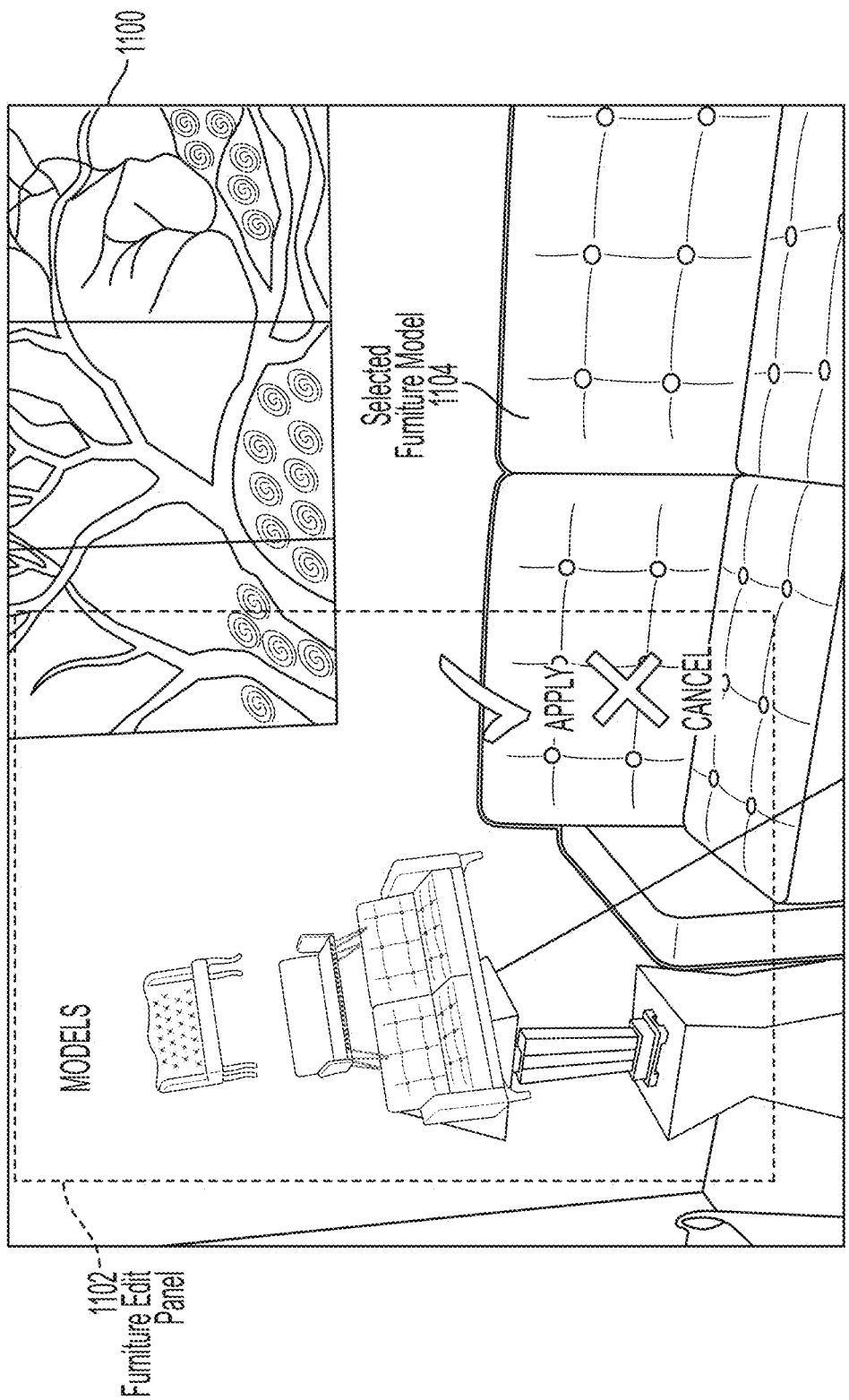
FIG. 11 is a diagram of an example XR interface screen including a furniture editing panel, according to some embodiments of the technology described herein.

Additionally (or alternatively), the furniture selection panel 902 may be employed to modify the furniture models already placed in the room. In some embodiments, upon selection of a furniture model in the model of the room, the system may permit the furniture model to be edited, cloned, or deleted used the "edit item," "clone item," or "delete item" buttons, respectively. For example, the system may detect selection of a furniture model in the virtual environment followed by activation of the "edit item" button. In this example, the system may replace the furniture selection panel 902 with a furniture editing panel. An example furniture editing panel is shown by the XR interface screen 1100 in FIG. 11. As shown, a selected furniture model 1104 is highlighted and the furniture editing panel 1102 displays the changes available to the selected furniture model 1104. For example, the furniture editing panel 1102 may display other furniture models that may replace the selected furniture model 1104 in the virtual environment. The changes to the selected furniture model 1104 may be applied to the virtual environment responsive to detecting activation of the "apply" button. Conversely, the changes to the selected furniture model 1104 may be canceled responsive to detecting activation of the "cancel" button.

Figure 12:
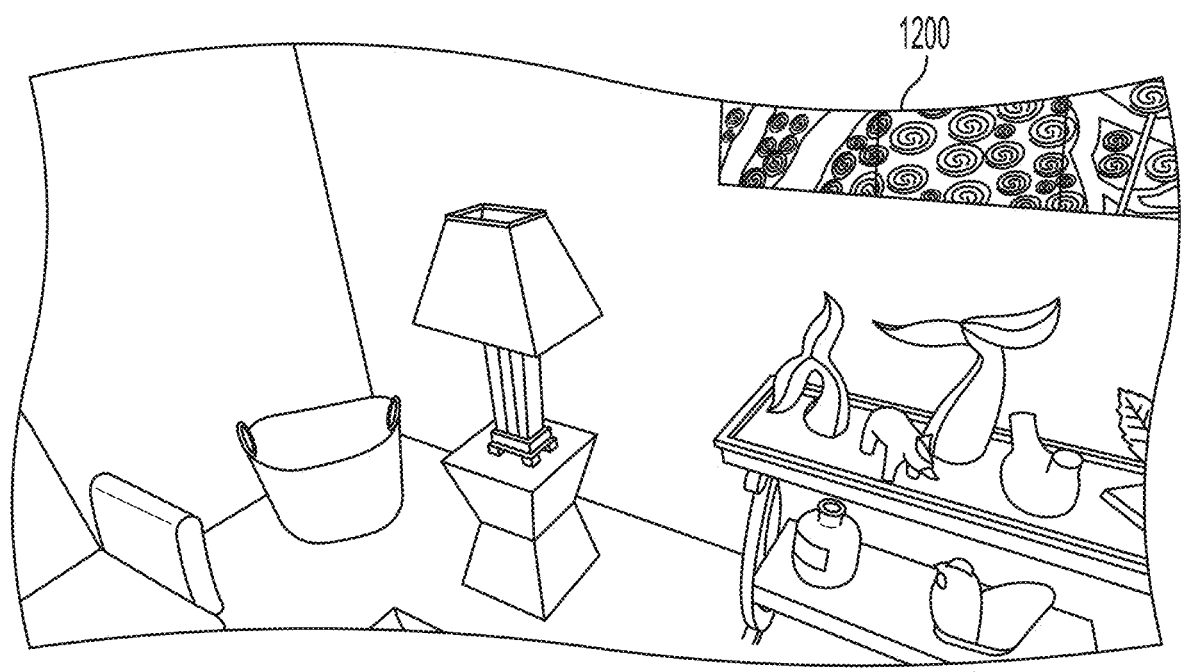
FIG. 12 is a diagram of an example XR interface screen showing an interior view of the virtual environment, according to some embodiments of the technology described herein.
Figure 13:
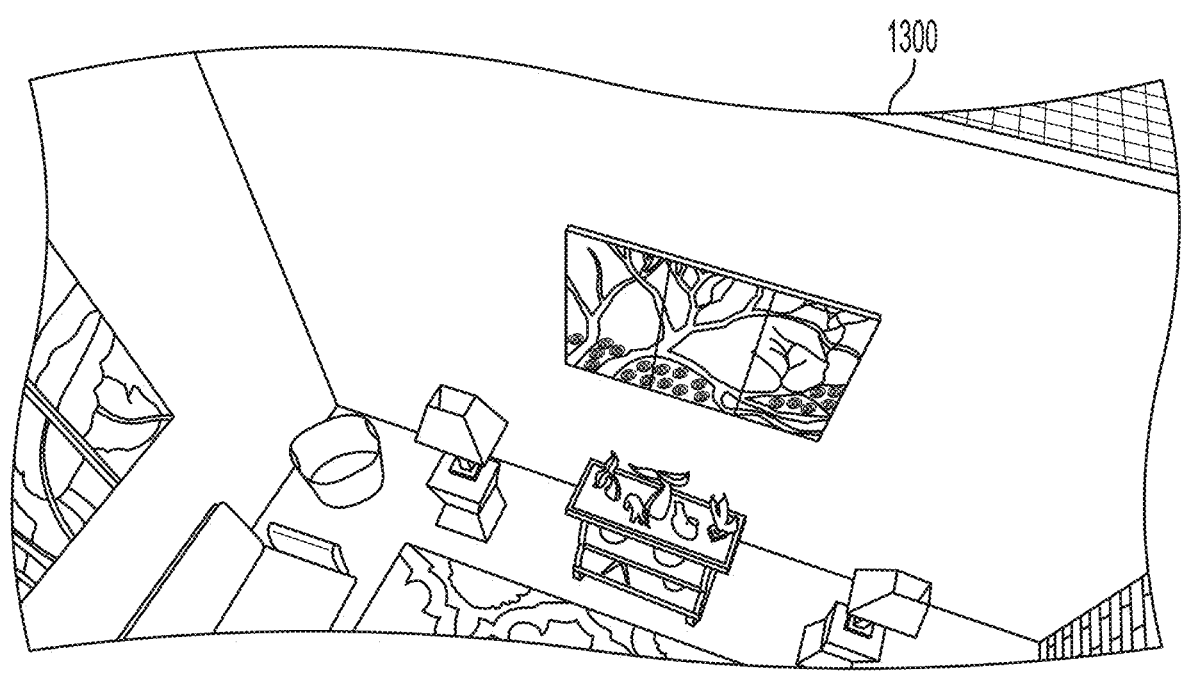
FIG. 13 is a diagram of an example XR interface screen showing a dollhouse view of the virtual environment, according to some embodiments of the technology described herein.

Returning to FIG. 8, the furniture display 802 may further include a view selection panel 806. The view selection panel may enable toggling between a plurality of different views of the virtual environment (e.g., by changing a scale of the model of the room in the virtual environment). For example, the view selection panel 806 may permit transitioning from an interior view where the system provides a view of the virtual environment from a perspective within the model of the room and a dollhouse view where the system provides a view of the virtual environment from a perspective outside the model of the room (e.g., above the model of the room). An example interior view of the virtual environment is shown in FIG. 12 by screen 1200 and an example dollhouse view of the same virtual environment is shown in FIG. 13 by screen 1300.

Figure 4:
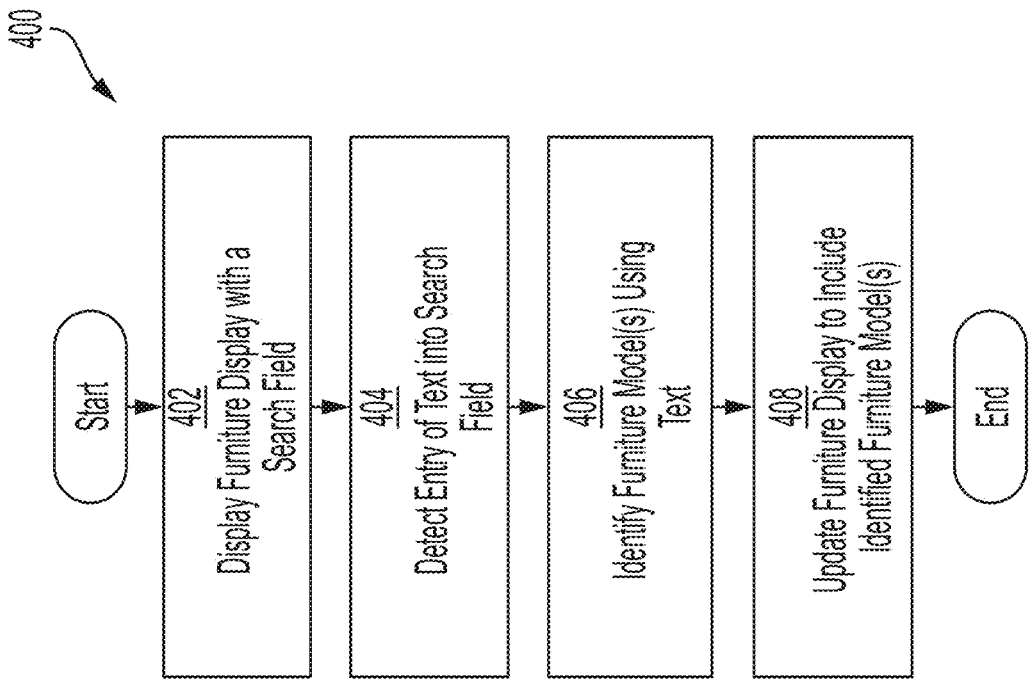
FIG. 4 is a flowchart of an example process for providing a furniture display to permit the addition of a furniture model to a virtual environment, according to some embodiments of the technology described herein.

FIG. 4 shows an example process 400 for providing a furniture display to permit the addition of a furniture model to a virtual environment. The process 400 may be performed by, for example, a XR system such as XR system 100 described above with reference to FIG. 1. As shown, the process 400 comprises an act 402 of displaying a furniture display with a search field, an act 404 of detecting entry of text into the search field, an act 406 of identifying furniture model(s) using the text, and an act 408 of updating the furniture display to include the identified furniture model(s).

In act 402, the system may display a furniture display to a user. The furniture display may comprise a plurality of furniture models that may be added to the virtual environment and a search field to receive text (e.g., a search string). The furniture display may be displayed in response to activation of one or more elements on a XR input/output device (e.g., XR control device 110).

In act 404, the system may detect entry of text into the search field in the furniture. For example, the system may detect entry of a search string (e.g., "three-seat couch") into the search field.

In act 406, the system may identify furniture model(s) using the text. The system may identify furniture model(s) using the text by identifying furniture models with one or more characteristics (e.g., defined in meta-information associated with the furniture models) that match the search string. For example, the system may display furniture models for a set of couches that seat three people in response to detecting entry of the search string "three-seat couch."

In some embodiments, the identified furniture models may be customized to the particular user. For example, an initial set of identified furniture models may be identified that match the search string and the initial set of identified furniture models may be modified to generate a customized set of identified furniture models. Thereby, different users may be presented a different selection of furniture models despite entering the same search string. The initial set of identified furniture models may be customized in any of a variety of ways. For example, furniture models may be added to the initial set of identified furniture models, removed from the initial set of identified furniture models, and/or the re-ordered within the initial set of identified furniture models. The identified furniture models may be customized using any of a variety of information regarding the user such as: product ordering history, product viewing history, age, gender, geographic location, and/or income level. For example, products that are similar to products previously purchased may be displayed first in the set while other products may be displayed later in the set.

In act 408, the system may update the furniture display to include the identified furniture model(s). For example, the system may add the identified furniture models to the furniture display and/or remove furniture models from the furniture display that do not match the identified furniture models.

It should be appreciated that the furniture display may make other filtering techniques available to the user separate and apart from a text search. For example, as discussed above, the furniture display may include a category filter that identifies those furniture models that are assigned to a particular furniture category and/or a dimension filter that identifies those furniture modes that have dimensions within a specified range (e.g., pieces of furniture that fit within a cube of a certain size).

Figure 5:
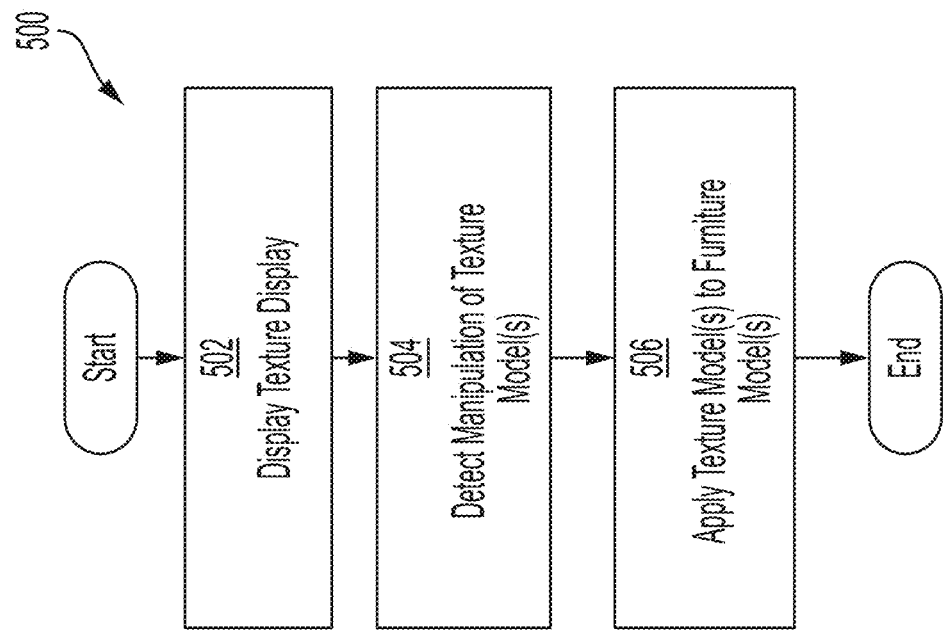
FIG. 5 is a flowchart of an example process for providing a texture display to permit the addition of a texture model to a furniture model in a virtual environment, according to some embodiments of the technology described herein.

In some embodiments, the XR interface may further comprise a texture display that permits a user to change a texture model applied to a furniture model in the model of the room. For example, the texture display may permit a user to change a material on a furniture model of a couch from fabric to leather. FIG. 5 shows an example process 500 for providing a texture display to permit the addition of a texture model to a furniture model in a virtual environment. The process 500 may be performed by, for example, a XR system such as XR system 100 described above with reference to FIG. 1. As shown, the process 500 comprises an act 502 of displaying a texture display, an act 504 of detecting manipulation of the texture model(s), and an act 506 of applying the texture model(s) to furniture model(s).

In act 502, the system may display a texture display to the user. The texture display may comprise a plurality of textures models that may be applied to one or more furniture models in the virtual environment. For example, the texture display may display a plurality of different fabrics that may be applied to a furniture model in the virtual environment. The texture display may be presented in response to activation of one or more elements on a XR input/output device (e.g., XR control device 110 and/or texture selection device 116).

In act 504, the system may detect manipulation of the texture model in the texture display. For example, the system may detect that one or more of the texture models in the texture display has been selected by a user using a XR input/output device (e.g., XR control device 110 and/or texture selection device 116)

In act 506, the system may apply the texture model to a furniture model in the virtual environment. For example, the system may apply a texture model for a particular fabric to a furniture model of a couch in the virtual environment.

Figure 14:
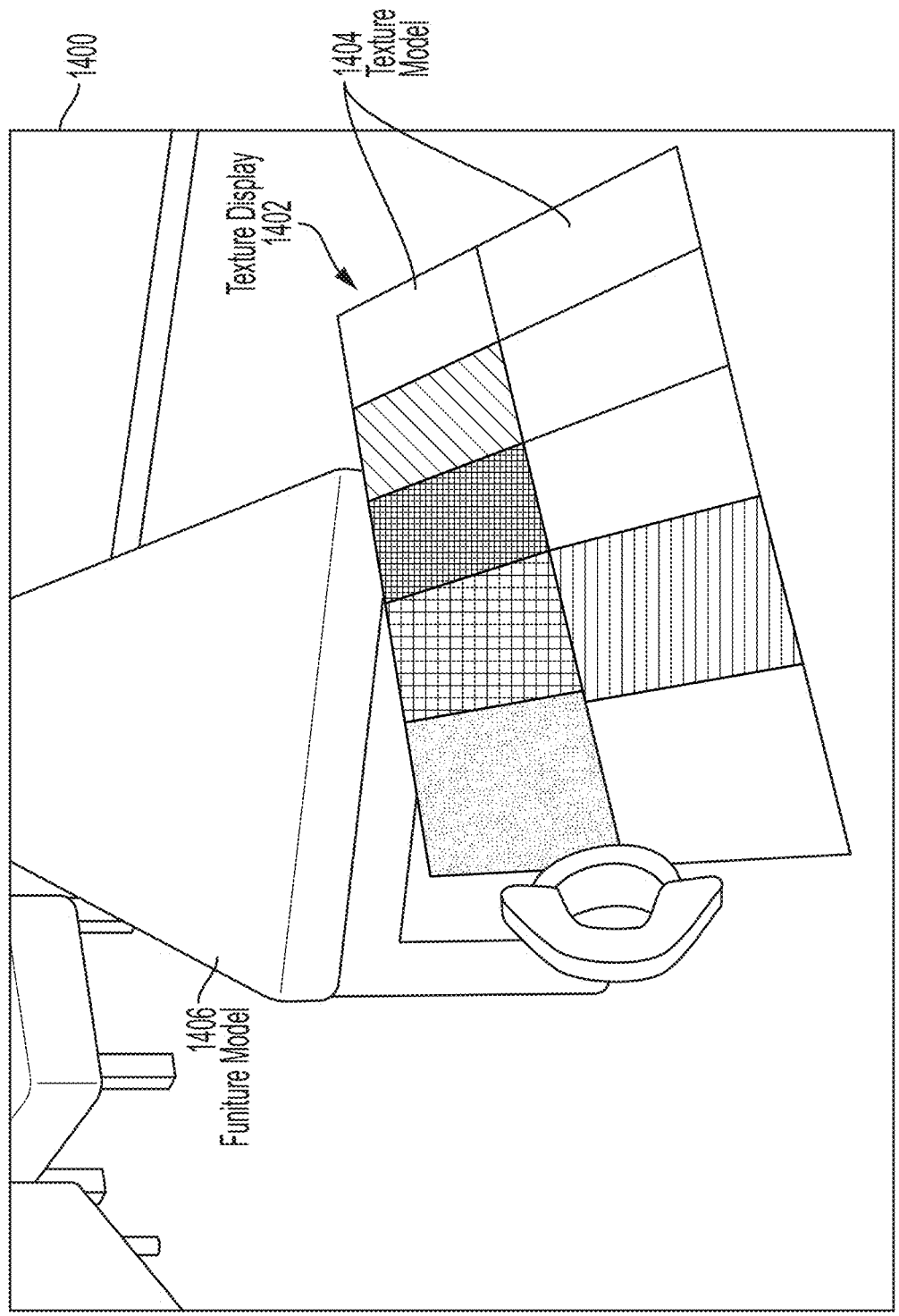
FIG. 14 is a diagram of an example XR interface screen including a texture display, according to some embodiments of the technology described herein.

An example texture display in an XR interface is shown in FIG. 14 by screen 1400. As shown, the screen 1400 includes a texture display 1402 that is overlaid onto a view of a virtual environment including a furniture model 1406. The texture display 1402 comprises a plurality of texture models 1404 that may be selected. The plurality of texture models 1404 may, for example, correspond to the different materials on the texture selection elements 117 of the texture selection device 116. A texture may be applied to a furniture model in the virtual environment by, for example, detecting selection of a furniture model (e.g., furniture model 1406) in the virtual environment and, subsequently, detecting selection of one of the texture models 1404 in the texture display 1402. In this example, the texture associated with the selected texture model 1404 may be applied to the selected furniture model.

Figure 6:
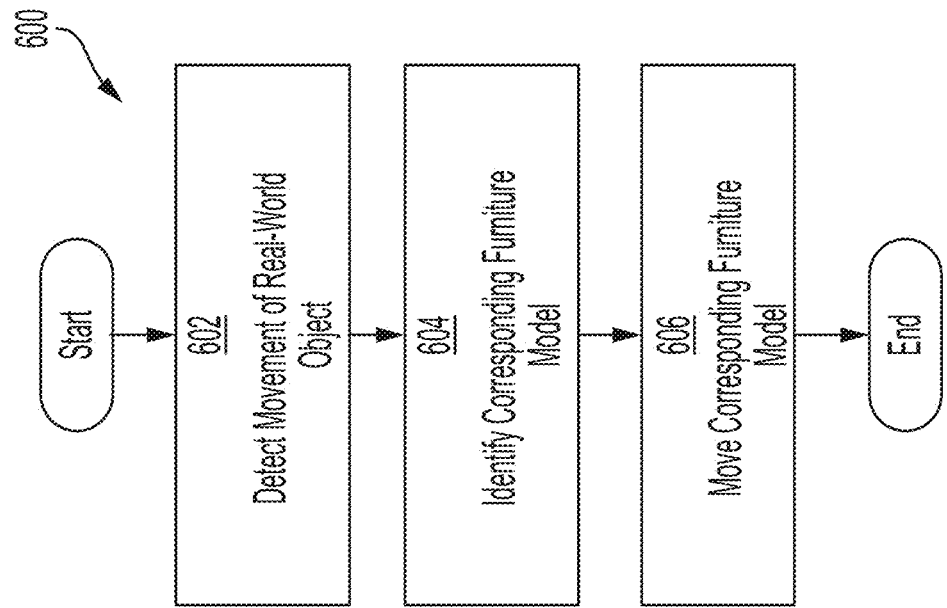
FIG. 6 is a flowchart of an example process for moving furniture model(s) in a virtual environment in-sync with movement of object(s) in a real-world environment, according to some embodiments of the technology described herein.

FIG. 6 shows an example process 600 for moving furniture model(s) in a virtual environment in-sync with movement of object(s) in a real-world environment. The process 600 may be performed by, for example, a XR system such as XR system 100 described above with reference to FIG. 1. As shown, the process 600 comprises an act 602 of detecting movement of a real-world object, an act 604 of identifying corresponding furniture model, and an act 606 of moving the corresponding furniture model.

In act 602, the system may detect movement of a real-world object (e.g., a piece of furniture). The system may identify a magnitude and/or direction of the movement of the real-world object. The system may use any of a variety of devices to detect movement of the real-world object such as the tracking device 112 described above.

In act 604, the system may identify a corresponding furniture model in the virtual environment. For example, the system may identify a furniture model in a model of the room that corresponds to the real-world object. The corresponding furniture model may be, for example, a model of the real-world object.

In act 606, the system may move the corresponding furniture. The system may move the corresponding furniture model in the same direction and with the same magnitude that the real-world object was moved. For example, the object may be moved 10 inches to the left in the real-world and a corresponding furniture model in the virtual environment may also be moved 10 inches to the left.

The processes described above are illustrative embodiments and are not intended to limit the scope of the present disclosure. The acts in the processes described above may be ordered in any suitable way. Accordingly, embodiments may be constructed in which acts are performed in an order different than illustrated, which may include performing some acts simultaneously, even though shown as sequential acts in illustrative embodiments.

Additional Example User Interface Screens

In some embodiments, the XR interface may display one or more miniature room models that are furnished with miniature furniture models. In these embodiments, the XR interface may permit a user to drag and drop one or more of the miniature furniture models into a room (e.g., a full-size room). Thus, the miniature furniture models may be moved from the miniature room model into a room and, upon being moved into the room, transition to a standard size room model that may be placed in the room.

Figure 15:
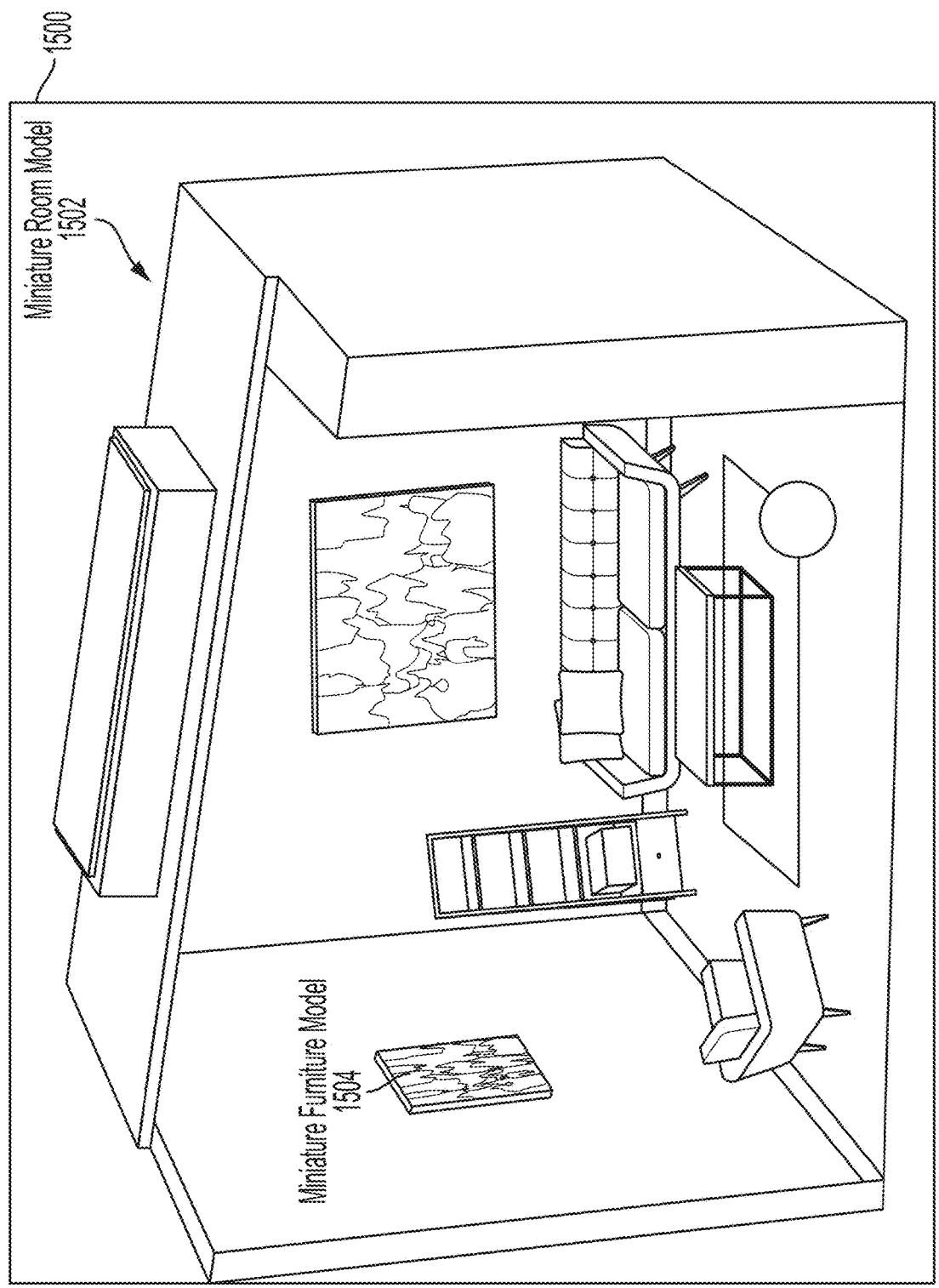
FIG. 15 is a diagram of an example XR interface screen including a miniature room model, according to some embodiments of the technology described herein.
Figure 16:
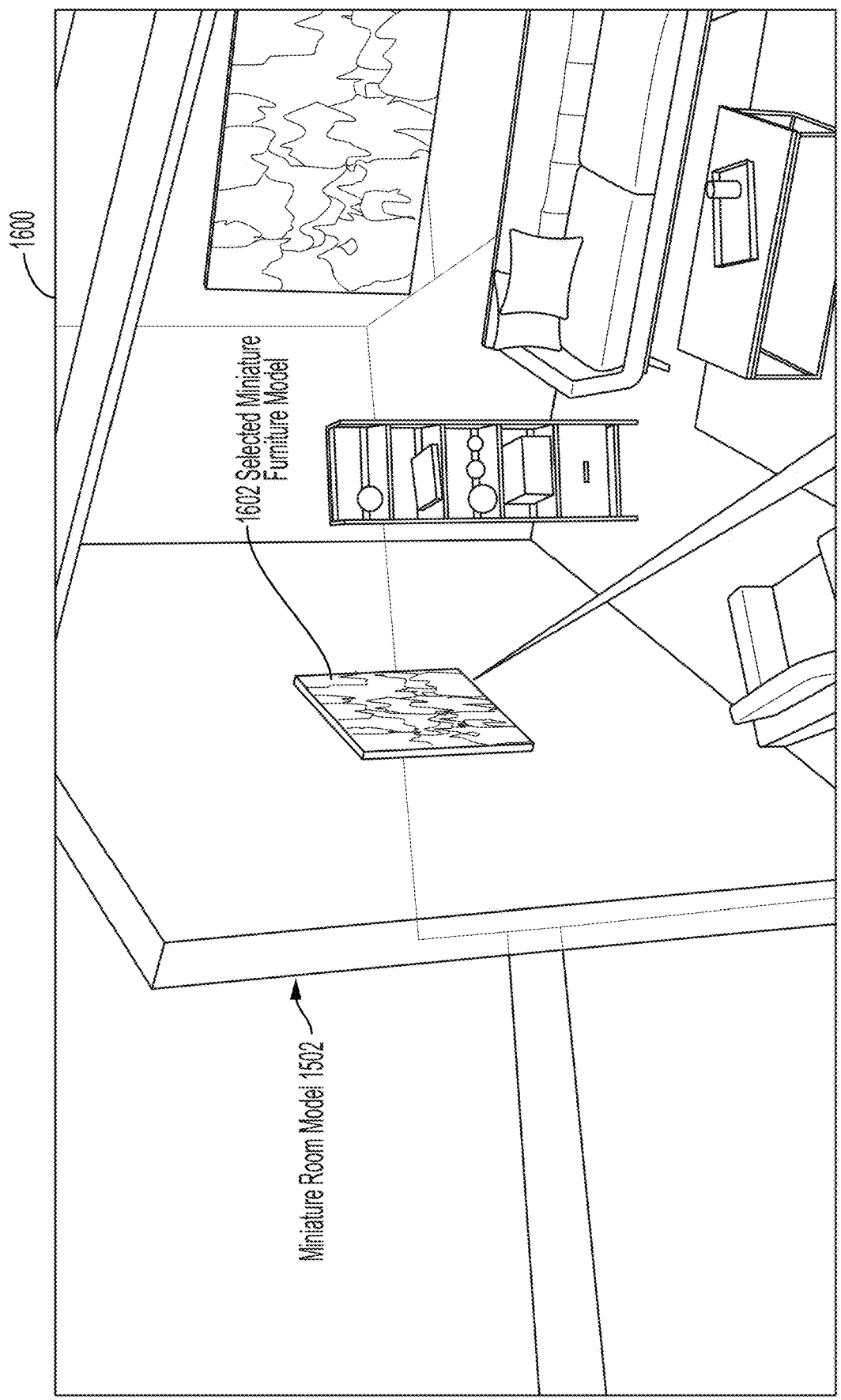
FIG. 16 is a diagram of another example XR interface screen including a miniature room model, according to some embodiments of the technology described herein.
Figure 17:
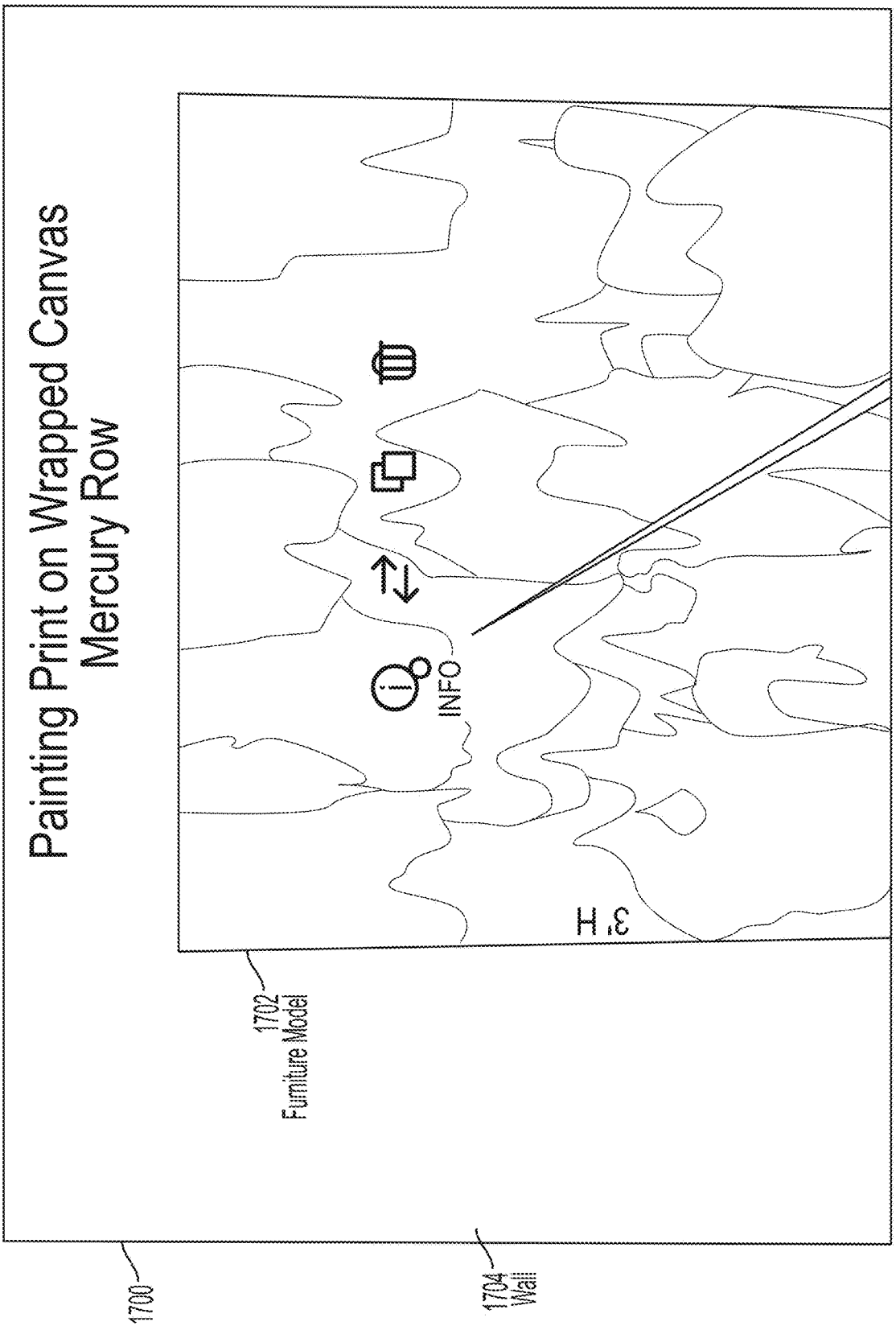
FIG. 17 is a diagram of an example XR interface screen including a furniture model moved from a miniature room model to a room model, according to some embodiments of the technology described herein.

An example of such an XR interface is shown by screen 1500 in FIG. 15. As shown, the screen 1500 includes a miniature room model 1502 including miniature furniture models 1504. The miniature room model 1502 is overlaid on a background that may comprise a model of a room (e.g., in a VR implementation) and/or a physical room (e.g., in an AR implementation). Any number of miniature room models 1502 may be displayed simultaneously to a user (e.g., 2, 3, 4, or 5 miniature room models). The XR interface may permit the miniature furniture models 1504 within the miniature room model 1502 to be selected by a user for placement in the room. Screen 1600 in FIG. 16 shows an example selected miniature furniture model 1602 in the miniature room model 1502. Once a miniature furniture model has been selected, the XR interface may permit the user to drag the selected furniture model into the room for placement. Once the selected miniature furniture model is moved into the room, the miniature furniture model may be resized for the room (e.g., increased in size). FIG. 17 shows a screen 1700 that results from dragging the selected furniture model 1602 from the miniature room model 1502 for placement on a wall 1702 in a room (e.g., a full-size room).

It should be appreciated that furniture models in the room may also be dragged from the room to a miniature room model. For example, the furniture model 1702 in FIG. 17 may be moved back to the miniature room model 1502 in FIG. 16. Thus, furniture models may be moved freely between the room and the miniature room models.

Example Computing Device

Figure 7:
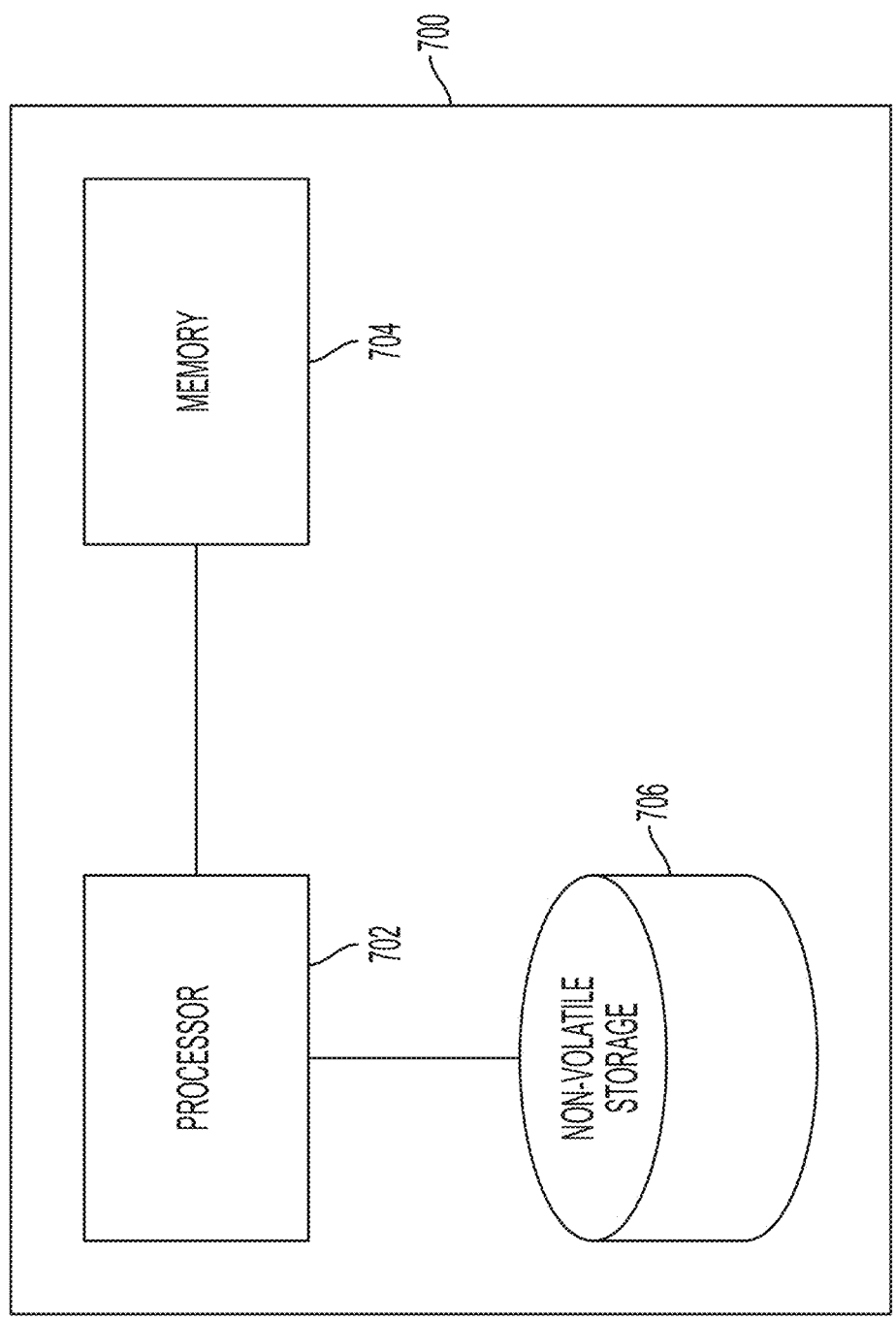
FIG. 7 is a block diagram of an example computer system, according to some embodiments of the technology described herein.

An illustrative implementation of a computing device 700 that may be used in connection with any of the embodiments of the disclosure provided herein is shown in FIG. 7. The computing device 700 may include one or more computer hardware processors 702 and one or more articles of manufacture that comprise non-transitory computer-readable storage media (e.g., memory 704 and one or more non-volatile storage devices 706). The processor 702(*s*) may control writing data to and reading data from the memory 704 and the non-volatile storage device(s) 706 in any suitable manner. To perform any of the functionality described herein, the processor(s) 702 may execute one or more processor-executable instructions stored in one or more non-transitory computer-readable storage media (e.g., the memory 704), which may serve as non-transitory computer-readable storage media storing processor-executable instructions for execution by the processor(s) 702.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system, comprising:
   an extended reality (XR) display device configured to display an XR interface to a user;
   at least one hardware processor communicatively coupled to the XR display device; and
   at least one non-transitory computer-readable storage medium storing processor executable instructions that, when executed by the at least one hardware processor, cause the at least one hardware processor to perform:
   receiving a model of a room;
   receiving a plurality of furniture models corresponding to a plurality of pieces of furniture;
   generating the XR interface using the model of the room and the plurality of furniture models and displaying the XR interface via the XR display device;
   displaying, via the XR interface, a furniture display comprising at least some of the plurality of furniture models and a search field to permit entry of text;
   detecting entry of a text string into the search field;
   identifying, using the text string, at least one furniture model from the plurality of furniture models;
   displaying, via the XR interface, the at least one furniture model in the furniture display;
   detecting manipulation of a first furniture model of the at least one furniture model in the furniture display;
   identifying at least one placement criteria responsive to detecting the manipulation of the first furniture model, the at least one placement criteria indicative of one or more surfaces in the model of the room on which the first furniture model may be placed and/or one or more surfaces in the model of the room on which the first furniture model may not be placed;
   adding the first furniture model to the XR interface by placing the first furniture model on a first surface that meets the at least one placement criteria; and
   displaying, via the XR interface, the first furniture model placed on the first surface.

2. The system of claim 1, wherein the processor-executable instructions further cause the at least one hardware processor to perform:
   identifying a flat surface of a second furniture model in the model of the room; and
   permitting, based on the at least one placement criteria, placement of the first furniture model onto the flat surface of the second furniture model in the XR interface.

3. The system of claim 1, wherein the processor-executable instructions further cause the at least one hardware processor to perform receiving a plurality of texture models corresponding to a plurality of textures and wherein the XR interface is generated using the plurality of texture models.

4. The system of claim 3, further comprising:
   at least one XR control device configured to receive input from the user in the XR interface; and
   wherein the processor-executable instructions further cause the at least one hardware processor to perform:
   displaying, via the XR interface, a texture display comprising at least some of the plurality of texture models;
   detecting, via the at least one XR control device, manipulation of a texture model in the texture display; and applying the texture model in the texture display to the first furniture model in the model of the room responsive to manipulation of the texture model in the texture display.

5. The system of claim 1, further comprising:
at least one XR control device configured to receive input from the user in the XR interface;
wherein the processor-executable instructions further cause the at least one hardware processor to perform:
displaying, via the XR interface, at least one configurable element to change a scale of the model of the room;
detecting, via the at least one XR control device, manipulation of the at least one configurable element; and
changing the scale of the model of the room responsive to detecting manipulation of the at least one configurable element.

6. The system of claim 1, further comprising a XR object tracking system communicatively coupled to the at least one hardware processor and configured to generate information indicative of a location of a real-world object that corresponds to the first furniture model in the model of the room.

7. The system of claim 6, wherein the XR object tracking system comprises:
a plurality of infrared (IR) detectors that are attached to the real-world object; and
at least one light source configured to emit IR light.

8. The system of claim 6, wherein the processor-executable instructions further cause the at least one hardware processor to perform:
detecting, via the XR object tracking system, movement of the real-world object using the information indicative of the location of the real-world object; and
moving the corresponding first furniture model in the model of the room based on the detected movement of the real-world object.

9. The system of claim 1, further comprising:
a texture selection device configured to receive input from the user comprising an indication of a texture model from a plurality of texture models to apply to the first furniture model in the model of the room, the texture selection device comprising a plurality of texture selection elements each being associated with one texture model of the plurality of texture models.

10. A method, comprising:
receiving a model of a room;
receiving a plurality of furniture models corresponding to a plurality of pieces of furniture;
generating an XR interface using the model of the room and the plurality of furniture models and displaying the XR interface via an XR display device;
displaying, via the XR interface, a furniture display comprising at least some of the plurality of furniture models and a search field to permit entry of text;
detecting entry of a text string into the search field;
identifying, using the text string, at least one furniture model from the plurality of furniture models;
displaying, via the XR interface, the at least one furniture model in the furniture display;
detecting manipulation of a first furniture model of the at least one furniture model in the furniture display;
identifying at least one placement criteria responsive to detecting the manipulation of the first furniture model, the at least one placement criteria indicative of one or more surfaces in the model of the room on which the first furniture model may be placed and/or one or more surfaces in the model of the room on which the first furniture model may not be placed;
adding the first furniture model to the XR interface by placing the first furniture model on a surface that meets the at least one placement criteria; and
displaying, via the XR interface, the first furniture model placed on the first surface.

11. The method of claim 10, further comprising:
identifying a flat surface of a second furniture model in the model of the room; and
permitting, based on the at least one placement criteria, placement of the first furniture model onto the flat surface of the second furniture model in the XR interface.

12. The method of claim 10, further comprising:
receiving a plurality of texture models corresponding to a plurality of textures and wherein the XR interface is generated using the plurality of texture models.

13. The method of claim 12, further comprising:
displaying, via the XR interface, a texture display comprising at least some of the plurality of texture models;
detecting, via at least one XR control device, manipulation of a texture model in the texture display; and
applying the texture model in the texture display to the first furniture model in the model of the room responsive to manipulation of the texture model in the texture display.

14. The method of claim 10, further comprising:
displaying, via the XR interface, at least one configurable element to change a scale of the model of the room;
detecting, via at least one XR control device, manipulation of the at least one configurable element; and
changing the scale of the model of the room responsive to detecting manipulation of the at least one configurable element.

15. The method of claim 10, further comprising generating, via a XR object tracking system, information indicative of a location of a real-world object that corresponds to the first furniture model in the model of the room.

16. The method of claim 15, further comprising:
detecting, via the XR object tracking system, movement of the real-world object using the information indicative of the location of the real-world object; and
moving the corresponding first furniture model in the model of the room based on the detected movement of the real-world object.

17. The method of claim 10, further comprising:
receiving, via a texture selection device, input from the user comprising an indication of a texture model from a plurality of texture models to apply to the first furniture model in the model of the room; and
applying the texture model to the first furniture model in the model of the room responsive to receiving the input.

18. At least one non-transitory computer-readable storage medium storing processor-executable instructions that, when executed by at least one processor, cause the at least one processor to perform:
receiving a model of a room;
receiving a plurality of furniture models corresponding to a plurality of pieces of furniture;
generating an XR interface using the model of the room and the plurality of furniture models and displaying the XR interface via an XR display device;
displaying, via the XR interface, a furniture display comprising at least some of the plurality of furniture models and a search field to permit entry of text;
detecting entry of a text string into the search field;
identifying, using the text string, at least one furniture model from the plurality of furniture models;

displaying, via the XR interface, the at least one furniture model in the furniture display;

detecting manipulation of a first furniture model of the at least one furniture model in the furniture display;

identifying at least one placement criteria responsive to detecting the manipulation of the first furniture model, the at least one placement criteria indicative of one or more surfaces in the model of the room on which the first furniture model may be placed and/or one or more surfaces in the model of the room on which the first furniture model may not be placed;

adding the first furniture model to the XR interface by placing the first furniture model on a surface that meets the at least one placement criteria; and displaying, via the XR interface, the first furniture model placed on the first surface.

19. The method of claim 10, further comprising:

receiving an altered design of the model of the room, the altered design comprising one or more of: a change to the first furniture model, a change to a location of the first furniture model in the model of the room, and an addition of a second furniture model in the model of the room; and displaying, via the XR interface, the altered design of the model of the room.

* * * * *